United States Patent [19]

Hathaway et al.

[11] Patent Number: 5,480,206
[45] Date of Patent: Jan. 2, 1996

[54] VEHICLE MODULAR RAIL SYSTEM HAVING COVER LOCKING ATTACHMENT

[75] Inventors: Richard C. Hathaway, Greenville; Mearl K. Bridges, New Madison; Donald R. Klein, Greenville, all of Ohio

[73] Assignee: CR&I Inc., Greenville, Ohio

[21] Appl. No.: 295,223

[22] Filed: Aug. 24, 1994

Related U.S. Application Data

[60] Continuation of Ser. No. 139,402, Oct. 19, 1993, abandoned, which is a division of Ser. No. 823,308, Jan. 21, 1992, Pat. No. 5,263,761.

[51] Int. Cl.⁶ ........................................ B60P 7/02
[52] U.S. Cl. .............................. 296/36; 296/100; 292/150
[58] Field of Search ........................ 296/32, 34, 36, 296/100; 292/32, 150, 156, 146; 70/58; 160/327, 354, 368.1; 403/321, 324, 326

[56] References Cited

U.S. PATENT DOCUMENTS

| | | | |
|---|---|---|---|
| 3,773,379 | 11/1973 | Loiseau | 296/107 |
| 3,882,575 | 5/1975 | Jolly | 24/661 |
| 4,333,678 | 6/1982 | Munoz et al. | 296/39.2 |
| 4,547,014 | 10/1985 | Wicker | 296/100 |
| 4,592,583 | 6/1986 | Dresen et al. | 296/39.2 |
| 4,615,557 | 10/1986 | Robinson | 296/100 |
| 4,730,866 | 3/1988 | Nett | 296/100 |
| 4,740,029 | 4/1988 | Tuerk | 296/100 |
| 4,762,360 | 8/1988 | Huber | 296/100 |
| 4,786,099 | 11/1988 | Mount | 296/98 |
| 4,807,921 | 9/1989 | Champie, III et al. | 296/98 |
| 4,813,735 | 3/1989 | Avitable | 296/100 |
| 4,824,162 | 4/1989 | Geisler et al. | 296/100 |
| 4,832,395 | 5/1989 | Lovaas | 296/100 |
| 4,861,092 | 8/1989 | Bogard | 296/100 |
| 4,923,240 | 5/1990 | Swanson | 296/100 |
| 4,936,724 | 6/1990 | Dutton | 410/110 |
| 4,944,612 | 7/1990 | Abstetar et al. | 296/39.2 |
| 4,986,590 | 1/1991 | Patti et al. | 296/39.2 |
| 4,991,640 | 2/1991 | Verkindt et al. | 296/100 X |
| 5,040,843 | 8/1991 | Russell et al. | 296/98 |
| 5,152,574 | 10/1992 | Tucker | 296/100 |
| 5,165,750 | 11/1992 | Pirhonen | 296/100 |
| 5,228,736 | 7/1993 | Dutton | 296/100 X |

FOREIGN PATENT DOCUMENTS 2517269  6/1983  France ........................ 296/100

Primary Examiner—Andrew C. Pike
Attorney, Agent, or Firm—Killworth, Gottman, Hagan & Schaeff

[57] ABSTRACT

A modular rail system is provided for supporting accessories on a pick-up truck bed. The system comprises first and second rail assemblies overlying the top surfaces of the first and second truck bed side walls for releasably connecting with the side walls. A flexible cover overlies the bed for covering and providing protection for the bed. A locking mechanism is likewise provided and is associated with the cover and the rail assemblies for lockingly attaching the cover to the rail assemblies and securing the cover in place over the truck bed. The rail system may additionally include a tie-down bar, a light bar, a utility box, a camper top, and a single or multi-piece bed liner, each of which is supported and connected to the rail assemblies.

5 Claims, 13 Drawing Sheets

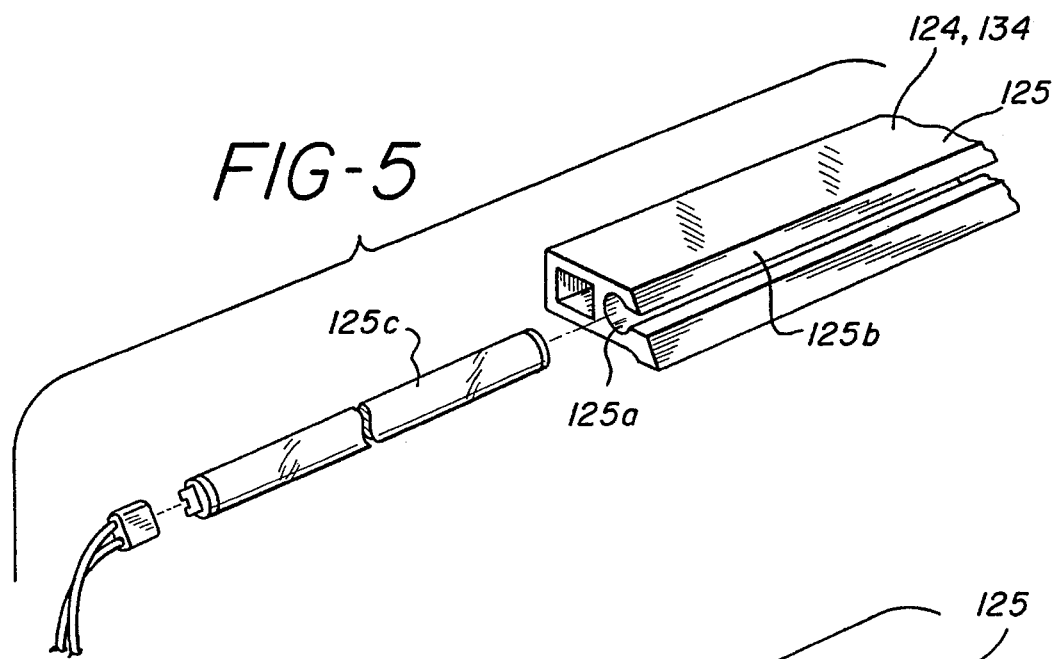
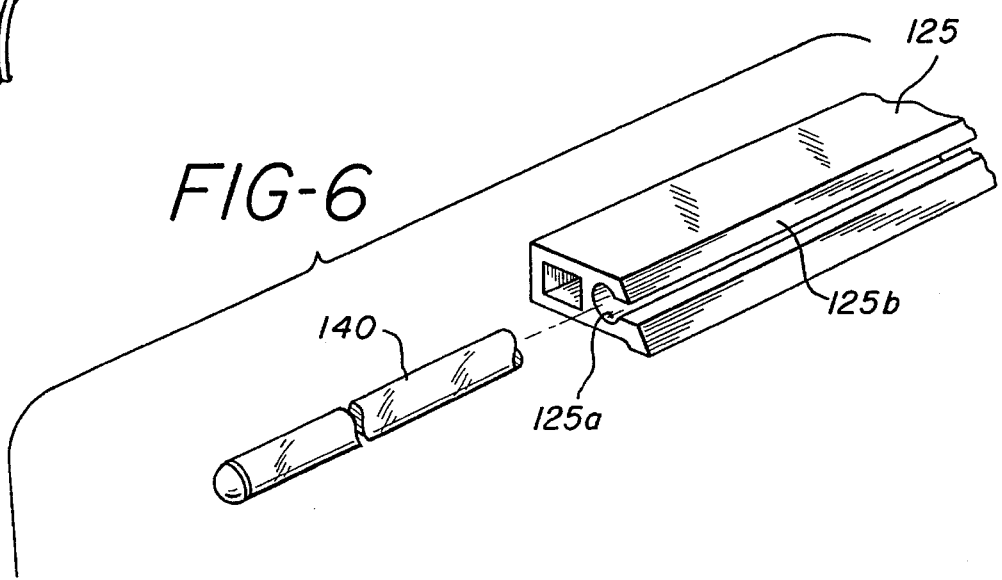
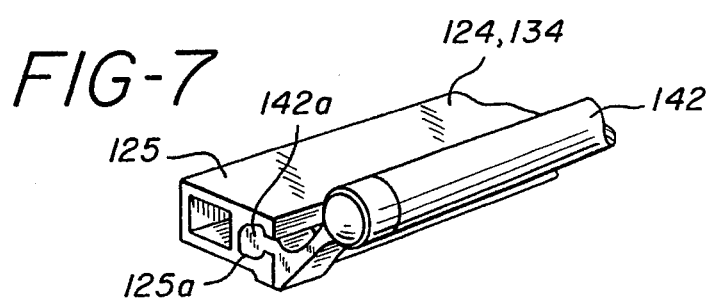

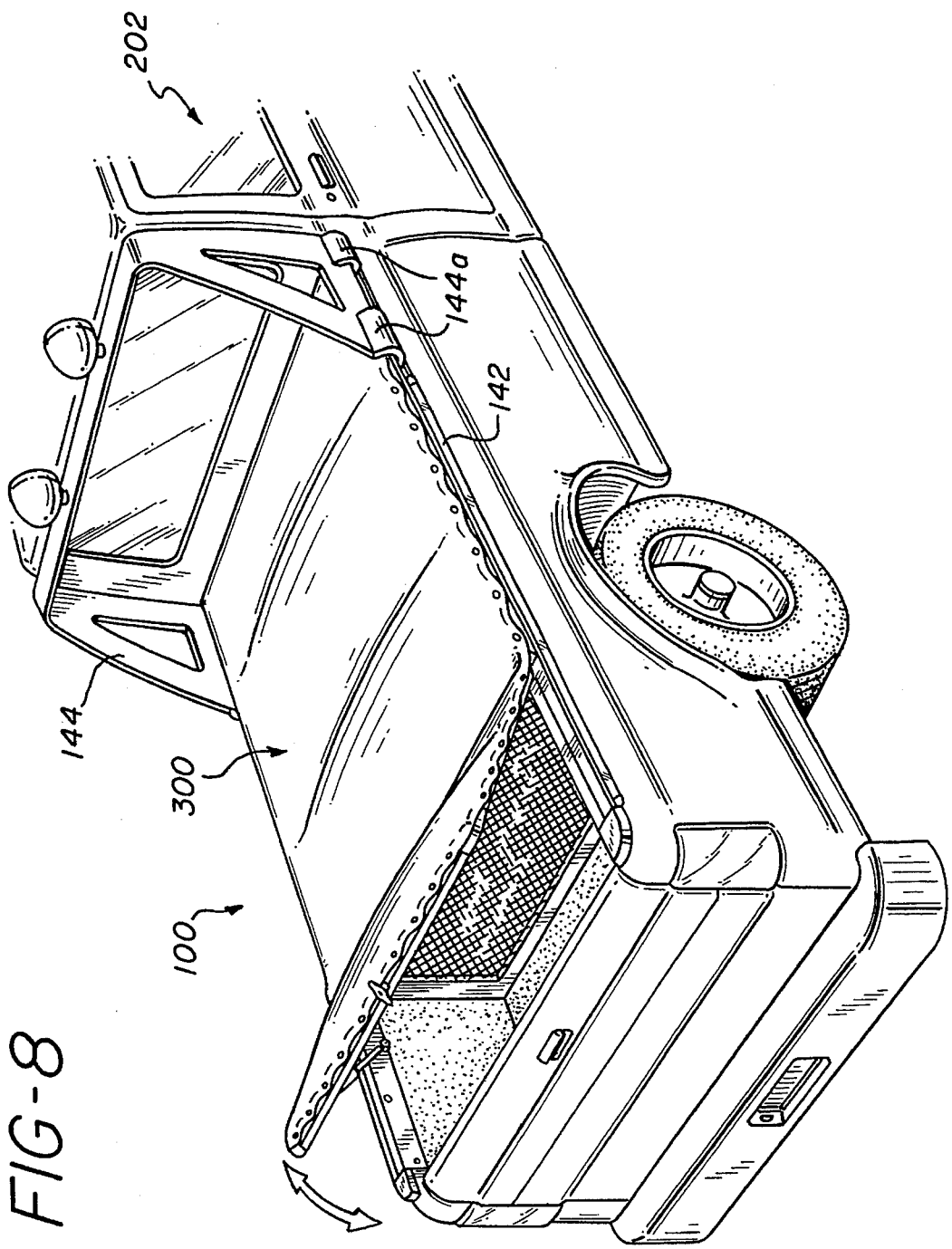

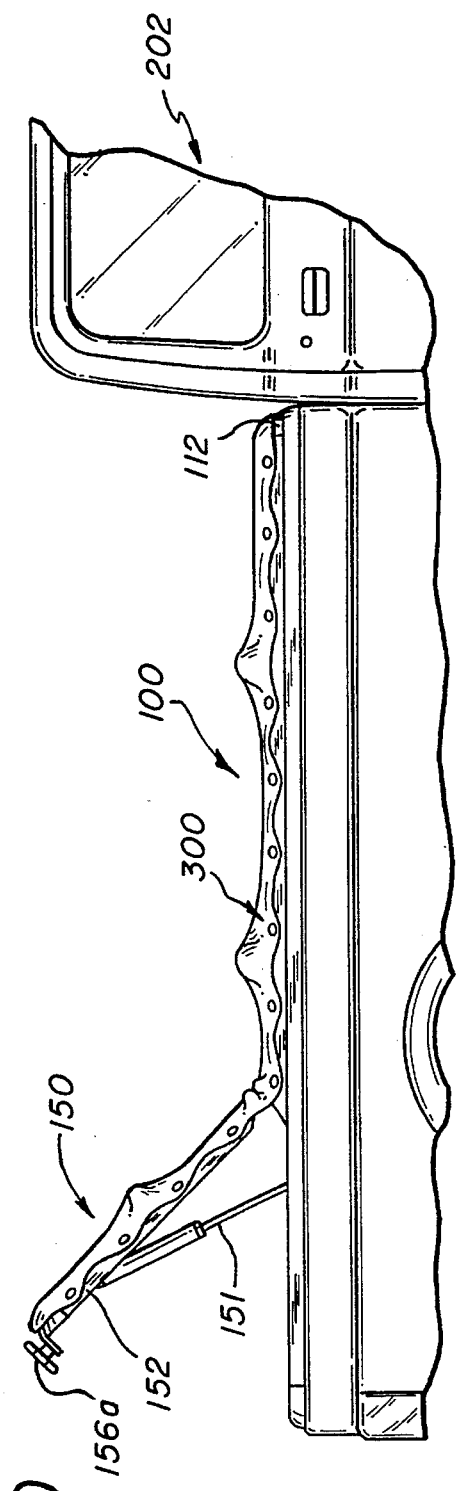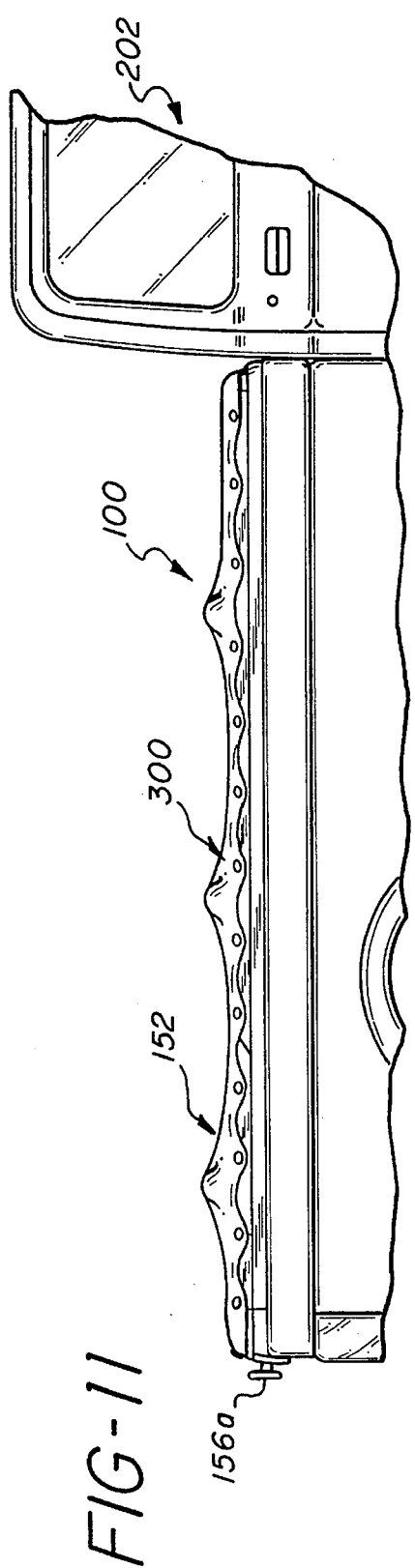

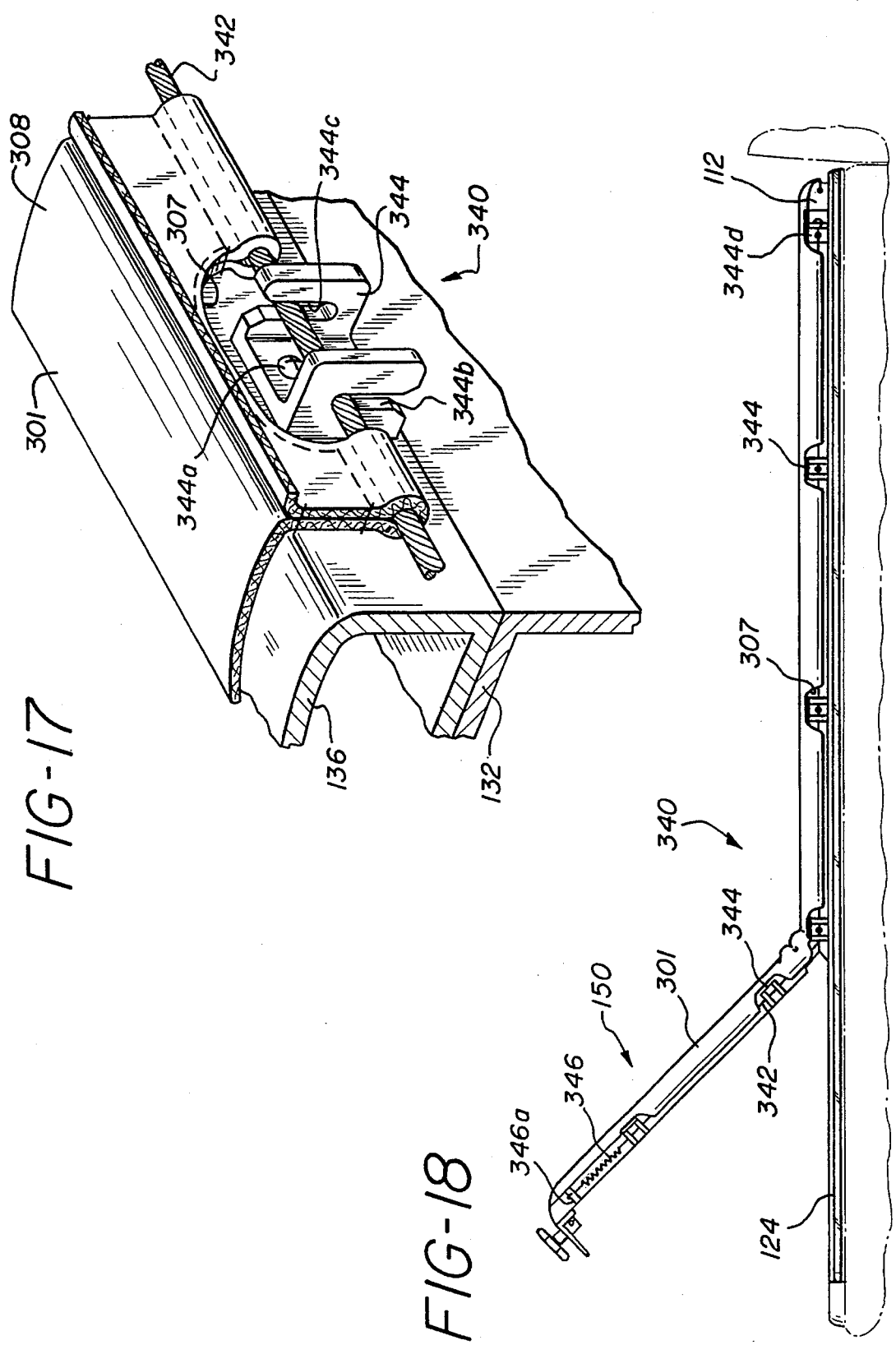

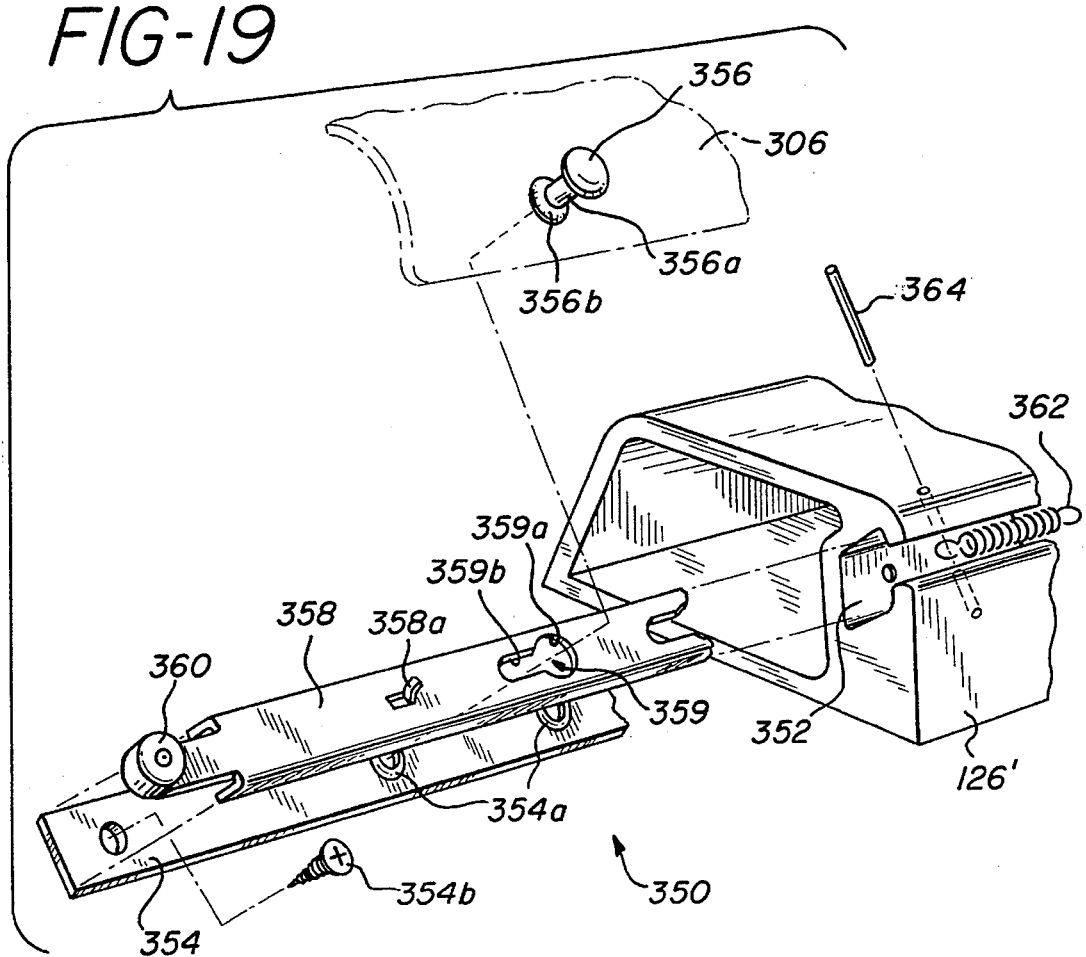
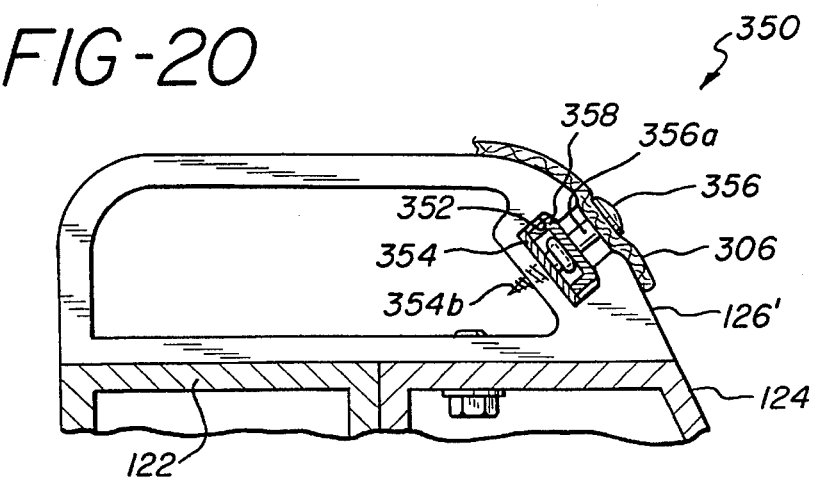

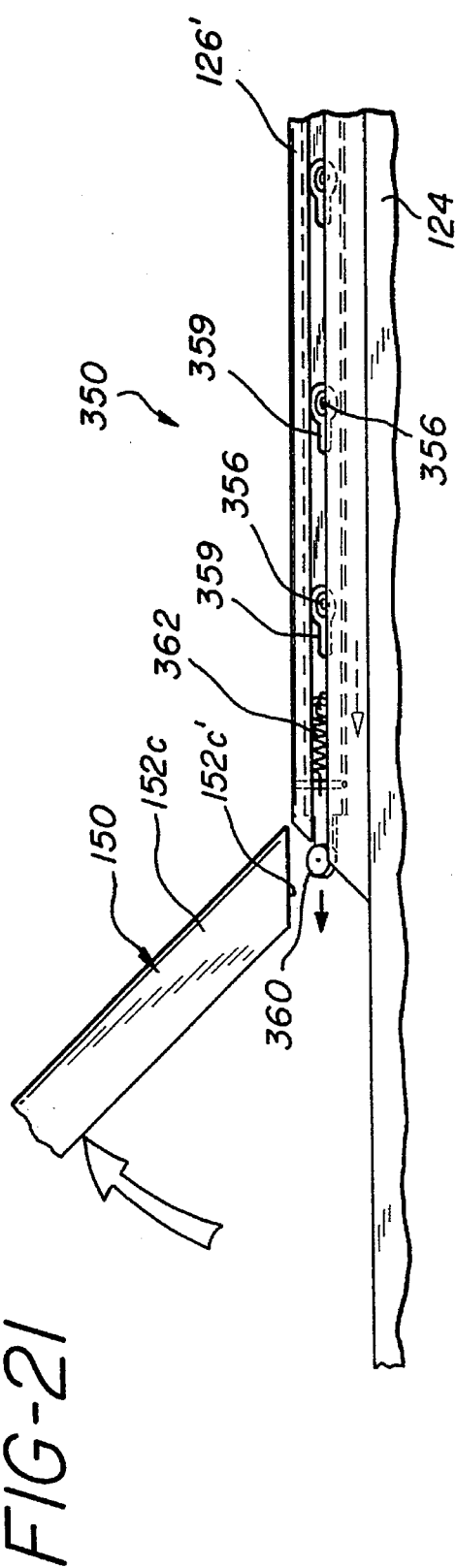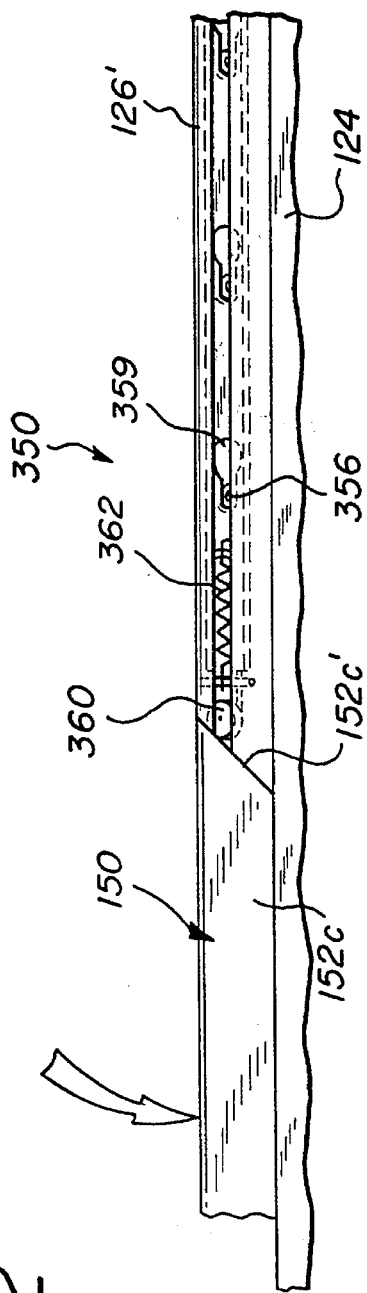

VEHICLE MODULAR RAIL SYSTEM HAVING COVER LOCKING ATTACHMENT

This is a continuation of application Ser. No. 08/139,402, filed Oct. 19, 1993, now abandoned, which in turn is a division of application Ser. No. 07/823,308, filed Jan. 21, 1992, now U.S. Pat. No. 5,263,761.

BACKGROUND OF THE INVENTION

The present invention relates generally to a vehicle modular rail system for a bed portion of a vehicle and, more particularly, to a vehicle modular rail system for supporting accessories on the bed of a pickup truck.

Accessories, such as tonneau covers, light bars, utility boxes, and the like, have been used in the past with pickup trucks. Such accessories are normally secured in place by fasteners which are oftentimes affixed through openings drilled into the truck bed side members. Those openings, however, have been found to be problematic since the areas surrounding the openings are susceptible to the formation of rust. Furthermore, if use of a particular accessory is no longer desired, the openings remain in the truck bed side members after the cover is discarded unless filled or otherwise repaired.

Accordingly, a need exists for a vehicle modular rail system for supporting pickup truck bed accessories without affixing any fasteners through openings in the truck bed side walls. Furthermore, a need exists for a single, versatile system which is capable of accommodating a number of different accessories, thereby allowing one or more desired accessories to be easily mounted onto a pickup truck bed.

SUMMARY OF THE PRESENT INVENTION

The present invention addresses the limitations of the prior art by providing a vehicle modular rail system for supporting various pickup truck bed accessories without requiring any fasteners to be affixed through openings in the truck bed side walls. The present invention also accommodates a number of different accessories, thereby allowing one or more desired accessories to be easily mounted onto a pickup truck bed.

In accordance with a first aspect of the present invention, a modular rail system is provided for supporting accessories on a pickup truck bed including a front wall, an end wall, and opposing first and second side walls. The system comprises first and second elongated rail assemblies. The first rail assembly includes a first base rail capable of releasably connecting with the first side wall, a first fill rail positioned adjacent to and connected with the first base rail, and a first cap rail overlying the first base rail and the first fill rail and being connected to one or both of the first base rail and the first fill rail. The second rail assembly includes a second base rail capable of releasably connecting with the second side wall, a second fill rail positioned adjacent to and connected with the second base rail, and a second cap rail overlying the second base rail and the second fill rail and being connected to one or both of the second base rail and the second fill rail.

Each of the first and second fill rails preferably comprises an elongated member having an outer surface and including an elongated channel located therein. The channel defines an opening in the outer surface of the member and serves to receive a decorative strip therein which is visible through the opening in the outer surface of the member. Alternatively, the channel may receive a light strip which is likewise visible through the opening in the outer surface of the member, a mating portion of a tie down member for connecting the tie down member to the elongated member, or a mating portion of a light bar for connecting the light bar to the elongated member.

Each of the first and second cap rails may comprise an elongated member having an outer surface and including an elongated channel formed therein. The channel defines an opening in the outer surface of the member and serves to receive a decorative strip therein which is visible through the opening in the outer surface of the member. Alternatively, the channel in each of the first and second cap rails may receive a light strip therein which is likewise visible through the opening in the outer surface of the member.

The rail system may further comprise a single-piece or multi-piece bed liner which is capable of being connected to the first and second rail assemblies. A light bar, a camper top, and a utility box may additionally form part of the system and each may connect with the first and second rail assemblies.

The rail system preferably further comprises a flexible cover means having a front edge, an end edge and first and second side edges, and positioned over the bed of the truck for covering the same. Further provided is attachment means associated with the first and second rail assemblies and the cover means for lockingly attaching the cover means to the first and second rail assemblies in position over the bed.

In a first embodiment of the present invention, the attachment means comprises a plurality of cross bar members which extend across the bed and lockingly connect with an inner portion of the first and second fill rails, and means located on the underside of the flexible cover means for joining the flexible cover means to the plurality of cross bar members, thereby securing the flexible cover means to the cross bar members.

In a second embodiment of the present invention, the attachment means comprises a plurality of attachment brackets connected to and spaced along the first and second fill rails, and cable means extending along at least the first and second side edges of the flexible cover means for connecting with the plurality of attachment brackets to secure the cover means to the first and second fill rails.

In a third embodiment of the present invention, the attachment means comprises a plurality of rail snap elements fixedly connected to the first and second fill rails, and a plurality of cover snap elements fixedly connected along at least a portion of the periphery of the flexible cover means. Each of the cover snap elements is capable of fastening with a corresponding rail snap element to attach the cover means to the first and second fill rails. Also provided are means for locking the cover snap elements in fastened engagement with the rail snap elements, thereby securing the cover means to the first and second fill rails.

In accordance with a second aspect of the present invention, a cover assembly is provided for a vehicle cargo area having a front wall, an end wall, and opposing first and second side walls. The side walls each include a generally horizontal top surface. The assembly comprises: rail means overlying the top surfaces of the first and second side walls for releasably connecting with the side walls of the vehicle; flexible cover means positioned over at least a portion the cargo area for covering the portion of the cargo area; and attachment means associated with the rail means and the flexible cover means for lockingly attaching the cover means to the rail means, thereby securing the flexible cover means in position over the portion of the cargo area.

The rail means preferably comprises first and second elongated rail assemblies as set forth above with respect to the first aspect of the present invention.

In the first embodiment of the present invention, the attachment means comprises a plurality of cross bar members which extend across the bed and lockingly connect with an inner portion of each of the first and second cap rails, and means located on the underside of the flexible cover means for securely joining the flexible cover means to the plurality of cross bar members.

In the second embodiment of the present invention, the attachment means comprises: a plurality of first attachment brackets spaced along and connected to the first cap rail; a plurality of second attachment brackets spaced along and connected to the second, cap rail; and, cable means which extend along at least the first and second side edges of the flexible cover means for connecting with the first and second attachment brackets for securing the cover means to the rail means.

In the third embodiment of the present invention, the first and second cap rails of the first and second rail assemblies each include an elongated recess formed therein. The attachment means comprises a first plurality of rail snap elements fixedly positioned in the first cap rail recess, and a second plurality of rail snap elements fixedly positioned in the second cap rail recess. Also provided are a plurality of cover snap elements fixedly positioned along at least a part of the periphery of the flexible cover means. Each of a first portion of the cover snap elements is capable of fastening with a corresponding rail snap element in the first cap rail recess, and each of a second portion of the cover snap elements is capable of fastening with a corresponding rail snap element in the second cap rail recess. First locking means are slidably positioned in the first cap rail recess for locking the first portion of the cover snap elements in fastened engagement with the first rail snap elements, and second locking means are slidably positioned in the second cap rail recess for locking the second portion of the cover snap elements in fastened engagement with the second rail snap elements.

According to preferred embodiments, it is an object of the present invention to provide a modular rail system for supporting accessories on a pickup truck. It is a further object of the present invention to provide an improved cover assembly for the cargo area of a vehicle, such as a pickup truck, which allows for quick and simple installation, high security, and easy access to the cargo area of the vehicle. It is another object of the present invention to provide a tonneau cover arrangement for covering and protecting the bed of a pickup truck wherein the arrangement includes a support rail assembly and attachment means for lockingly connecting a tonneau cover to the support rail assembly. It is an additional object of the present invention to provide a modular rail system for the bed of a pickup truck wherein the system may include a protective cover, a light bar, a utility box, a camper top, and a single-piece or multi-piece bed liner, each of which is capable of being supported and connected to first and second rail assemblies. It is yet an additional object of the present invention to provide a modular rail system for protecting the side wall top surfaces of the bed of a pickup truck. These and other objects and advantages of the invention will be apparent from the following description, the accompanying drawings and the appended claims.

BRIEF DESCRIPTION OF THE DRAWINGS

FIG. 5 is an exploded, perspective view of a portion of a fill rail having a channel and a light strip capable of being received within the channel;

FIG. 6 is an exploded, perspective view of a portion of a fill rail having a channel and a decorative strip capable of being received within the channel;

FIG. 7 is a partial, perspective view of a fill rail including a mating support member of a tie down member received within its channel;

FIG. 8 is perspective view of the rail system of the present invention mounted onto the bed of a pickup truck and including a light bar and a tie down member connected to the fill rail of the first rail assembly;

FIG. 10 is a side view of the rail system mounted onto the bed of a pickup truck with the hatch assembly in an "up" position;

FIG. 11 is a side view of the rail system mounted onto the bed of a pickup truck with the hatch assembly in a "down" position;

FIG. 17 is partial, perspective view of attachment means of a second embodiment of the present invention;

FIG. 18 is a side view of the rail system with the first cap rail and a side member of the hatch assembly removed showing the attachment means of the second embodiment of the present invention;

FIG. 19 is an exploded, perspective view of attachment means of a third embodiment of the present invention;

FIG. 20 is a cross-sectional view of the attachment means of the third embodiment of the present invention;

FIG. 21 is a partial, side view of the rail system with the cover removed, the hatch assembly in the "up" position, and showing the attachment means of the third embodiment of the present invention;

FIG. 22 is a partial, side view of the rail system with the cover removed, the hatch assembly in the "down" position, and showing the attachment means of the third embodiment of the present invention; and, FIG. 23 is perspective view of the rail system of the present invention mounted onto the bed of a pickup truck and including a utility box connected to the rail means.

DETAILED DESCRIPTION OF THE INVENTION

Figure 1:
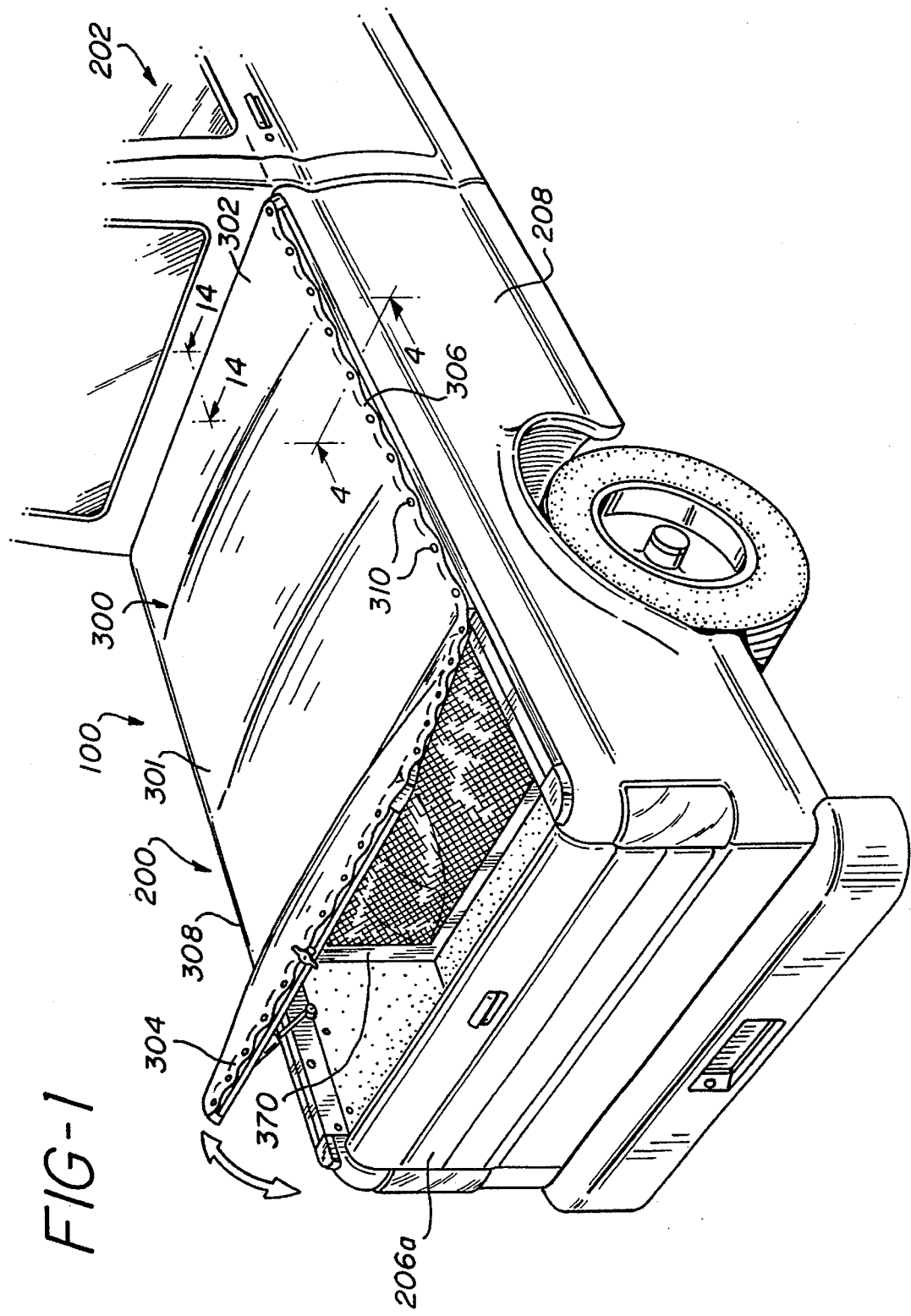
FIG. 1 is a perspective view of the modular rail system of the present invention mounted onto the bed of a pickup truck.
Figure 2:
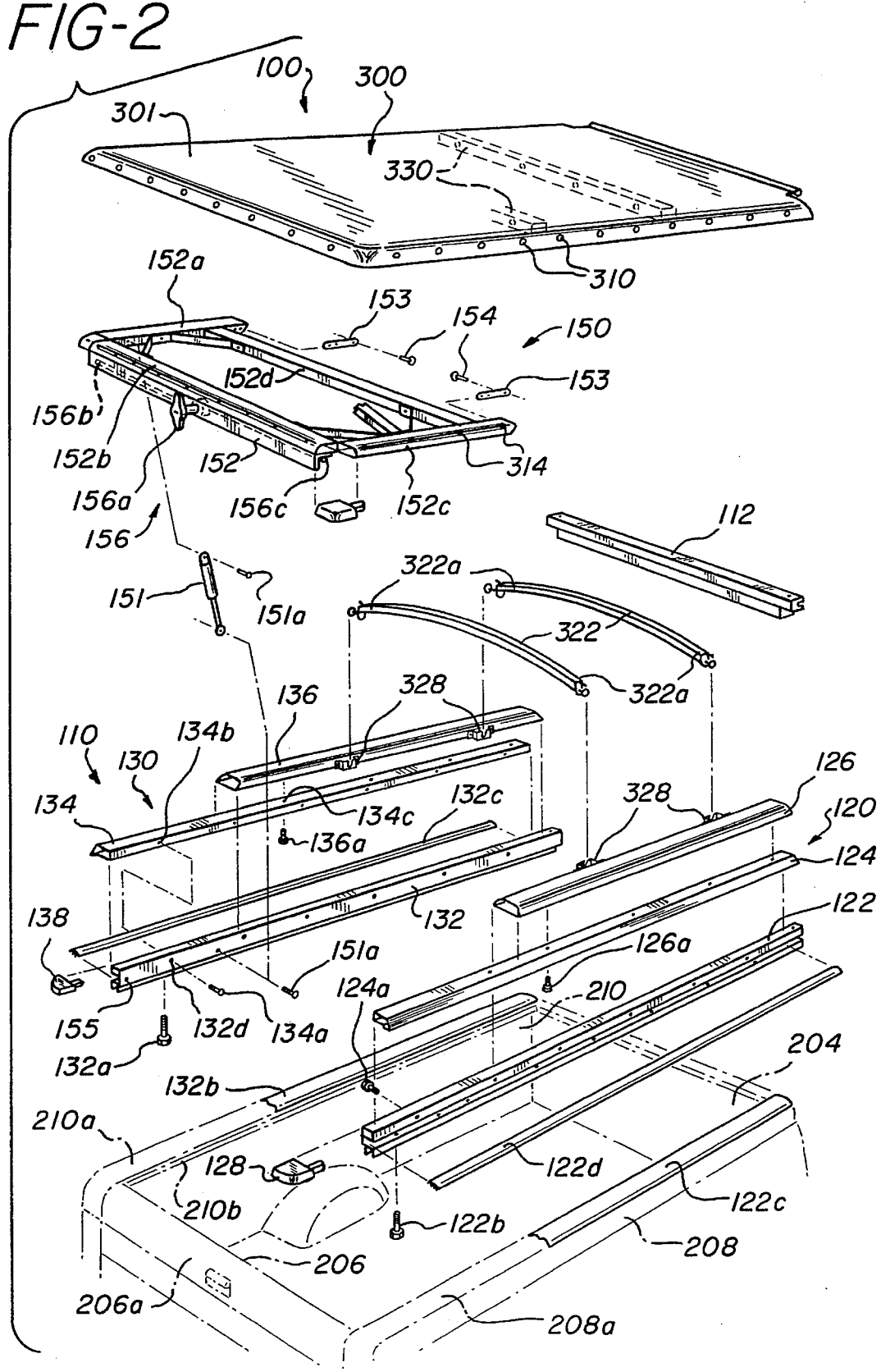
FIG. 2 is an exploded view of the rail system shown in FIG. 1.

The modular rail system of the present invention, generally designated by the reference numeral 100, is shown in FIG. 1 mounted to a bed 200 of a pickup truck 202. Referring also to FIG. 2, the truck bed 200 includes a front wall portion 204, a rear wall portion 206, formed by tailgate 206a, and opposing first and second side wall portions 208 and 210, respectively. Each of the first and second side wall portions 208 and 210 includes a top surface 208a and 210a, respectively. Rail means 110 is positioned over the top surface 208a of the first side wall portion 208 and the top surface 210a of the second side wall portion 210 for releasably connecting with the first and second side wall portions 208 and 210 of the pickup truck. By releasably connecting with the side wall portions 208 and 210 of the truck 202, the rail means 110 acts to releasably connect the rail system 100 to the pickup truck bed 200 without affixing any fasteners through openings in the truck bed 200 or otherwise damaging the bed 200 to secure the rail system 100 thereto.

Referring again to FIG. 2, which is an exploded view of the rail system 100, the rail means 110 comprises first and second elongated rail assemblies 120 and 130, respectively. The first rail assembly 120, which is also shown in cross-section in FIGS. 3 and 4, includes a first base rail 122 having one or more openings 122a therein for threadedly receiving one or more bolts 122b or like fasteners. Each bolt 122b, upon being threaded upward within it corresponding opening 122a, acts to clamp the base rail 122 to an extended portion 208b of the first side wall portion 208. Positioned intermediate the top surface 208a of the first side wall 208 and the base rail 122 is a first, upper protective strip 122c. Positioned intermediate a lower surface 208c of the first side wall portion 208 and the bolts 122b is a lower support plate 122d.

The first rail assembly 120 further includes a first fill rail 124 which overlies the protective strip 122c and is positioned adjacent to the first base rail 122. One or more bolts 124a or like fasteners pass through openings 122e in the base rail 122 and threadedly engage with openings 124b in the fill rail 124 to connect the fill rail 124 with the base rail 122. Located above the first base rail 122 and the first fill rail 124 is a first cap rail 126. The cap rail 126 is connected to the fill rail 124 by One or more bolts 126a or like fasteners which pass through openings 124c in the fill rail 124 and threadedly engage with openings 126b in the cap rail 126. Alternatively, the cap rail 126 could be connected to either the base rail 122 alone or to both the fill rail 124 and the base rail 122. End caps 128 are also provided for closing off the end portions of the base rail 122 and the fill rail 124.

The second rail assembly 130, which is substantially the same as the first rail assembly 120, is shown in FIG. 2 and includes a second base rail 132 having one or more openings (not shown) for threadedly receiving one or more bolts 132a or like fasteners. The bolts 132a, upon being threaded upward within their respective openings, act to clamp the base rail 132 to an extended portion 210b of the second side wall portion 210. Positioned intermediate the top surface 210a and the base rail 132 is a second, upper protective strip 132b. Positioned intermediate a lower surface (not shown) of the second side wall portion 210 and the bolts 132a is a second, lower support plate 132c.

The second rail assembly 130 further includes a second fill rail 134 which overlies the protective strip 132c and is positioned adjacent to the second base rail 132. One or more bolts 134a or like fasteners pass through openings 132d in the base rail 132 and threadedly engage within openings 134b in the fill rail 134 to connect the fill rail 134 with the base rail 132. Located above the second base rail 132 and the second fill rail 134 is a second cap rail 136. The cap rail 136 is connected to the fill rail 134 by one or more bolts 136a or like fasteners which pass through openings 134c in the fill rail 134 and threadedly engage within openings (not shown) in the cap rail 136. Alternatively, the cap rail 136 could be connected to either the base rail 132 alone or to both the fill rail 134 and the base rail 132. End caps 138 are additionally provided for closing off the end portions of the base rail 132 and the fill rail 134.

It is further contemplated that the rails 122, 124 and 126 of the first rail assembly, and the rails 132, 134 and 136 of the second rail assembly, could be interconnected by interlocking means (not shown) rather than by bolts. The interlocking means would comprise one or more projections on a first rail member which would engage and lock with a corresponding recess or opening in a second rail member to join the two rail members to one another. It is additionally contemplated that the rails of the two rail assemblies 120 and 130 could be welded to one another, or formed together as a single unit.

Referring now to FIGS. 5–8, each of the first and second fill rails 124 and 134 is preferably formed from an elongated member 125 having an elongated channel 125a located therein. The channel 125a defines an opening in the outer surface 125b of the elongated member 125 and receives a light strip 125c therein, as shown in FIG. 5, which is visible through the opening in the outer surface 125b. The light strip 125c is connected to the truck's 202 electrical system in a known manner for receiving electrical energy for purposes of illumination. The channel 125a may alternatively receive a decorative strip 140, as shown in FIG. 6; a mating support member 142a of a tie down member 142, as shown in FIGS. 7 and 8; and/or mating support members 144a of a light bar 144, as also shown in FIG. 8.

While not explicitly shown in the drawings, each of the cap rails 126 and 136 may include a channel formed therein for receiving a light strip, a decorative strip, a support member of a tie down member, and/or support members for a light bar.

Figure 9:
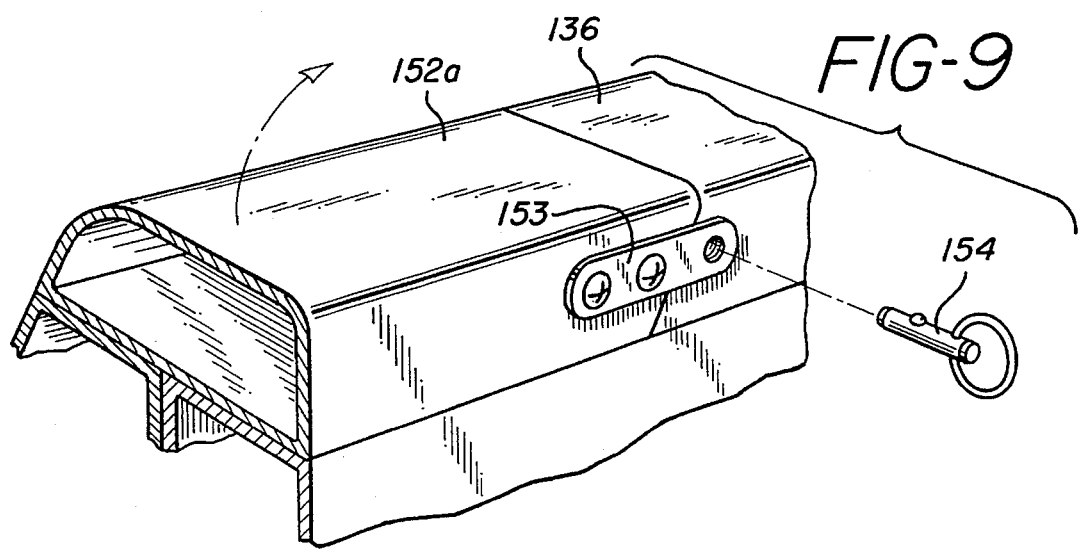
FIG. 9 is a partial, perspective view of a hinge and a removable pin for removably connecting a frame member of the hatch assembly to one of the cap rails.

Referring again to FIG. 2, the rail means 110 preferably includes a hatch assembly 150, also referred to herein as hatch means, for providing easy access to the truck bed 200. The hatch assembly 150 includes a hatch frame 152 made from frame members 152a–152d which are bolted, welded or otherwise connected to one another. Frame member 152a as releasably connected to cap rail 136 by a hinge 153 and removable pin 154, as shown in FIG. 9. Frame member 152c is releasably connected to cap rail 126 in a similar fashion. It should be apparent that other means not explicitly disclosed herein may also be employed for releasably connecting the hatch frame 152 with the first and second cap rails 126 and 136. A piston-cylinder unit 151 or like support can be provided for supporting the hatch frame 152 in an "up" or "open" position, as shown in FIG. 10. The piston-cylinder unit 151 is connected by bolts 151a or like fasteners to the hatch frame 152 and the base rail 132.

The hatch means 150 further includes locking means 156 for releasably locking the hatch frame 152 in a closed position. The locking means 156 comprises a handle member 156a which is operatively connected to first and second movable locking rods 156b and 156c. The rods 156b and 156c are capable of being received within corresponding openings 155 in the base rails 122 and 132 (only the opening 155 in base rail 132 is shown) for locking the frame 152 to the base rails 122 and 132. Consequently, upon rotation of the handle member 156a, the hatch frame 152 can be released to an unlocked position and moved to an "up" position, as shown in FIG. 10, or can be locked to the base rails 122 and 132 in a "down" position, as shown in FIG. 11. When the hatch frame 152 is in the "down" position, frame member 152b overlaps tailgate 206a to lock the same in position.

Figure 12:
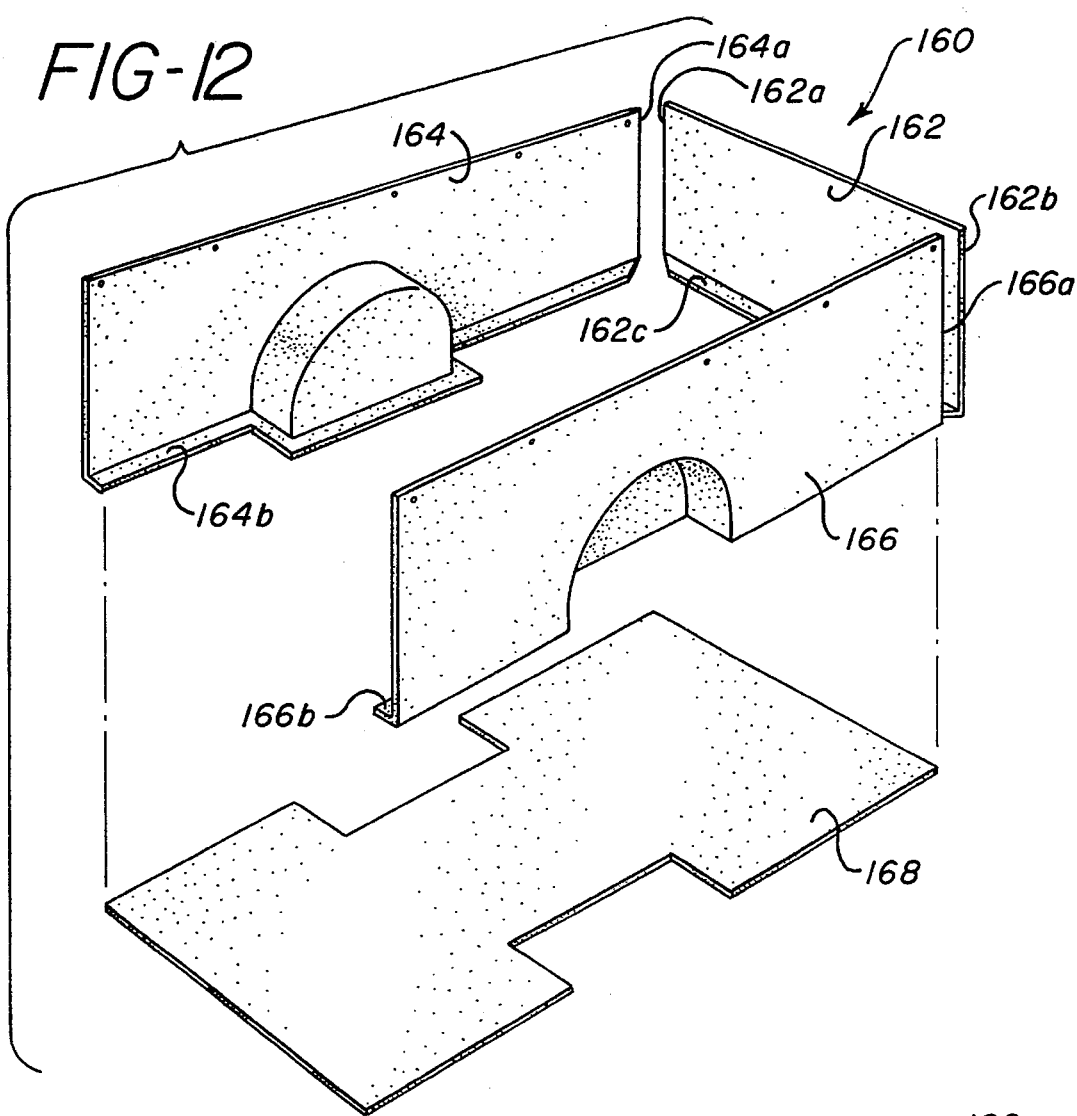
FIG. 12 is an exploded, perspective view of a multi-piece bed liner which forms part of the system of the present invention.

A multi-piece bed liner 160 is preferably provided within the truck bed 200 for protecting the bed 200 against damage caused by cargo stowed therein. As shown in FIG. 12, the multi-piece bed liner 160 comprises a front section 162, first and second side sections 166 and 164, respectively, and a floor section 168. The floor section 168 is preferably formed from a nonslip material, which may be a different material from that used for the front and side sections. End portions 162a and 162b of the front section 162, end portion 166a of the first side section 166, and end portion 164a of the second side section 164 are shown in FIG. 12 having substantially straight edges. While not shown in FIG. 12, the end portions 162a and 162b of the front section 162 are joined with the end portions 166a and 164a of the first and second side sections 166 and 164 via clamps, adhesive tape or other conventional securing means.

Figure 13:
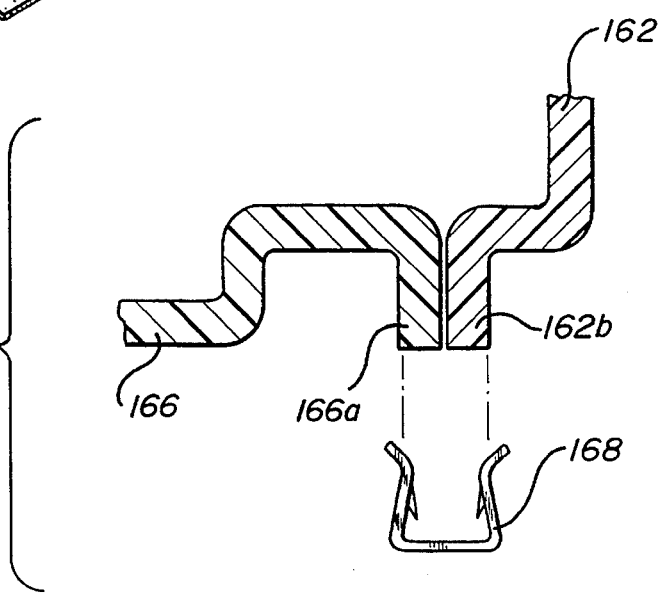
FIG. 13 is an enlarged cross sectional view of an end portion of a front section and an end portion of a side section of a multi-piece bed liner and a clip for connecting the two portions together.

It is further contemplated that end portions 162a and 162b of the front section 162, and end portions 166a and 164a of the side sections 166 and 164 may be formed having a C-shape. For example, FIG. 13 shows end portions 166a and 162b having a C-shape. A metal clip 168 is also shown for joining the end portions 162a and 162b to one another to provide strength and rigidity to the corners. It is additionally contemplated that the sections 162, 164, 166 and 168 of the liner 160 may be formed having a shape which substantially resembles that of an actual truck bed, i.e., they include all of the curves and valleys of a truck bed. It is further contemplated that a single-piece bed liner (not shown) may be employed in place of the multi-piece bed liner 160.

As shown in FIG. 12, the front section 162 of the liner 160 includes an L-shaped base portion 162c, and the first and second side sections 166 and 164 likewise include L-shaped base portions 166b and 164b, respectively. The floor section 168, when positioned within the truck bed 200, overlies the base portions 162c, 166b and 164b and is joined thereto via tape or like securing means (not shown).

Figure 3:
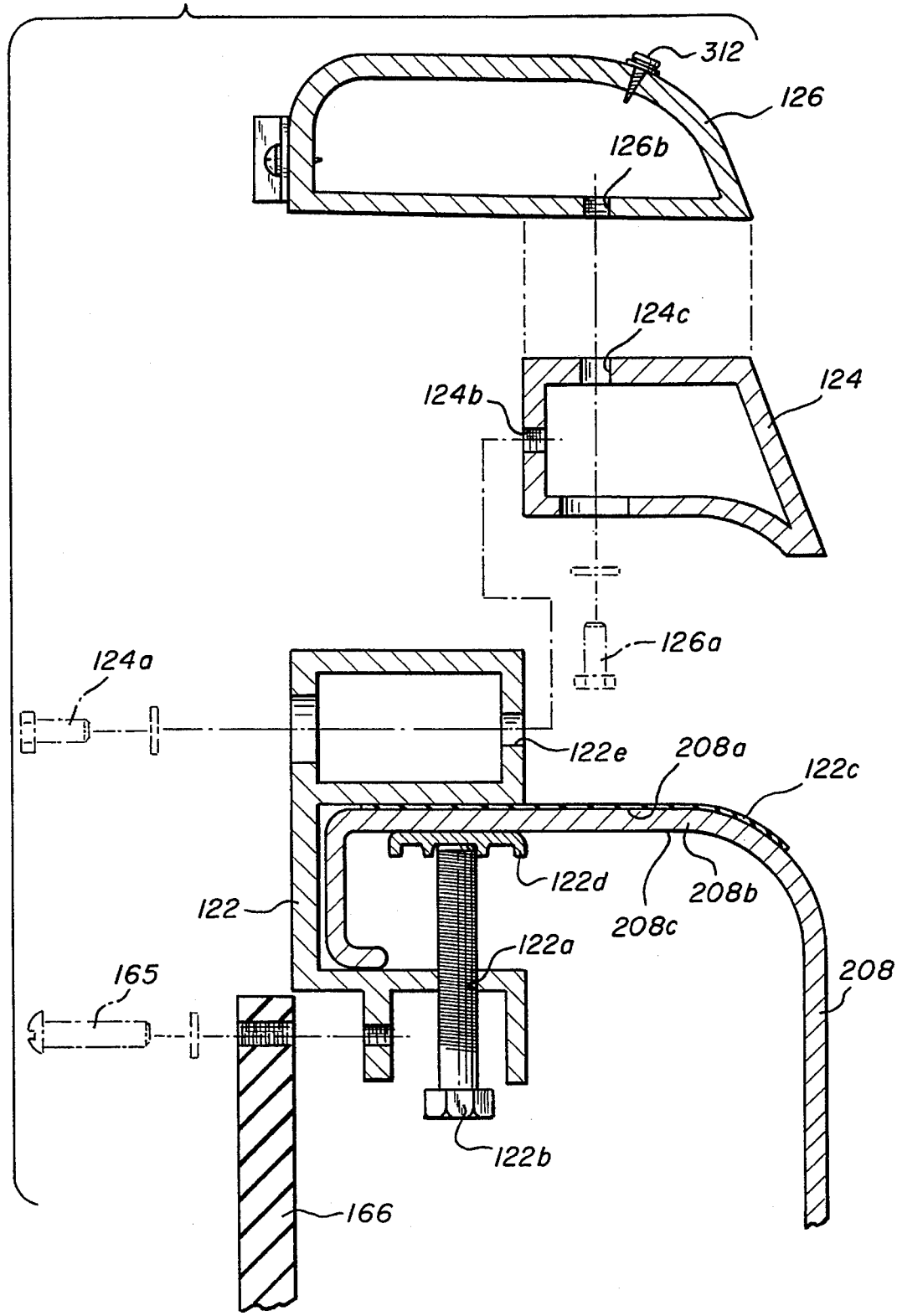
FIG. 3 is an exploded, cross-sectional view of the first rail assembly shown in FIG. 2.
Figure 4:
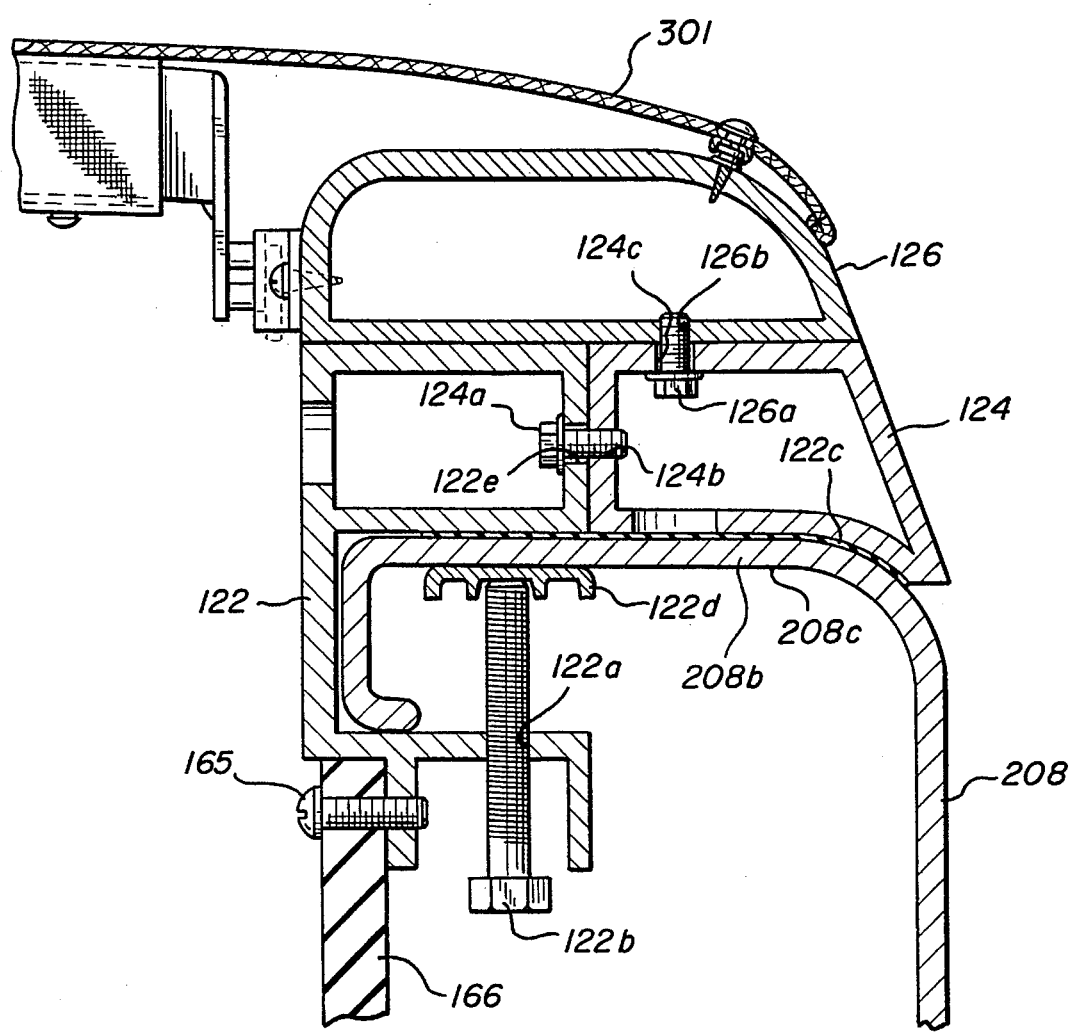
FIG. 4 is a cross-sectional view taken generally along section line 4—4 in FIG. 1.

As shown in FIGS. 3 and 4, the multi-piece bed liner 160 is connected directly to the rail means 110 via bolts 165 or like fasteners which pass through the first and second side sections 166 and 164. Consequently, fasteners which must be affixed through openings drilled into the bed 200 are not necessary for securing the liner 160 to the truck bed 200.

Referring again to FIG. 1, flexible cover means 300 is positioned over the truck bed 200 to cover and protect the bed 200 from theft, vandalism and the environment. The flexible cover means 300 comprises a protective cover 301, also referred to herein as a tonneau cover, having a front edge 302, an end edge 304 and first and second side edges 306 and 308. The cover 301 is formed from waterproof cloth or like material.

Figure 15:
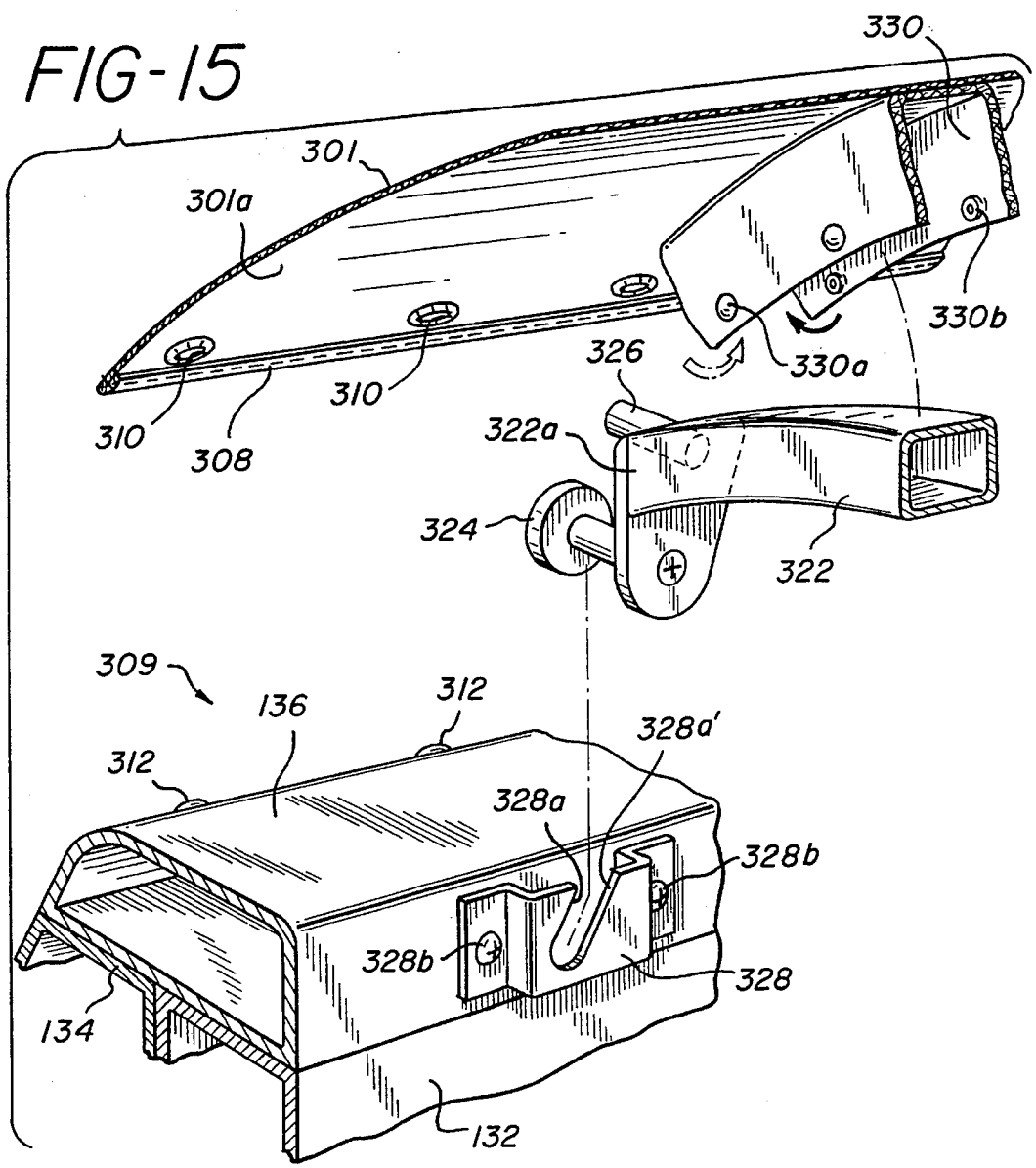
FIG. 15 is an exploded, perspective view of attachment means of a first embodiment of the present invention showing one end of a cross bar member and an attachment bracket having an angled slot for receiving locking pins of the cross bar member.

Attachment means 309, shown best in FIG. 15, is provided for removably attaching the protective cover 301 to the rail means 110. The attachment means 309 includes a plurality of cover snap elements 310 fixedly attached to edges 304, 306 and 308 of the cover 301 (see also FIG. 1) for fastening with corresponding rail snap elements 312 fixedly positioned along the first and second cap rails 126 and 136, and hatch snap elements 314 (see FIG. 2) fixedly positioned about frame members 152a–152c. The cover snap elements 310, the rail snap elements 312 and the hatch snap elements 314 serve to attach the cover 301 to the first and second cap rails 126 and 136 and to the hatch assembly 150. Preferably, the cover elements 310 are female snap elements while the rail elements 312 and the hatch elements 314 are male snap elements. Both male and female snap elements are conventional and well-known in the art.

Figure 14:
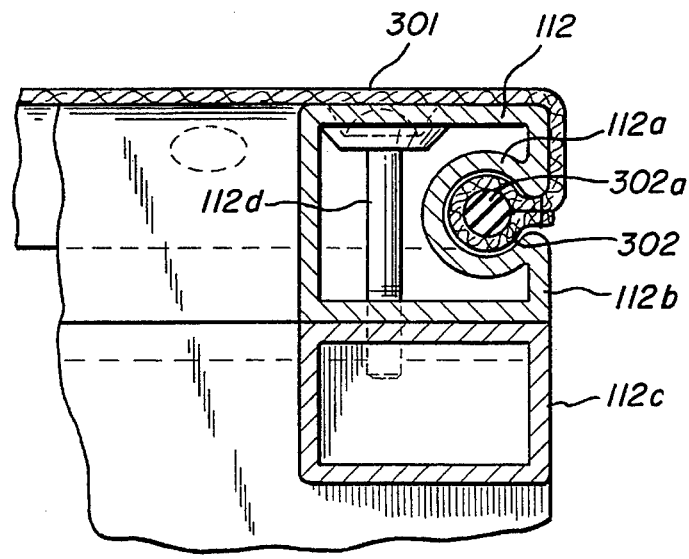
FIG. 14 is a cross-sectional view taken generally along section line 14—14 in FIG. 1.

The attachment means 309 further comprises an interlocking rod or cord 302a, shown in FIG. 14, which is sewn or otherwise attached to the front edge 302 of the cover 301. The rod or cord 302a is received within a mating recess 112a of a front rail member 112 for connecting the front edge 302 of the cover 301 to the rail means 110. The front rail member 112 is formed from first and second rail members 112b and 112c which are connected to one another by one or more bolts 112d. Alternatively, the front rail member 112 could be formed from a single rail member (not shown). The first rail member 112b overlies the first and Second base rails 122 and 132 and the first and second fill rails 124 and 134. The front rail member 112 is bolted, welded or otherwise fastened to the first and second base rails 122 and 132.

For providing additional security for the bed 200, the attachment means 309 further comprises a plurality of cross bar members 322, shown in FIGS. 2 and 15. Each end 322a of the cross bar members 322 is provided with first and second locking pins 324 and 326, respectively, which are received within angled slots 328a of brackets 328. The brackets 328 are secured along the first and second cap rails 126 and 136 by bolts 328b.

Figure 16:
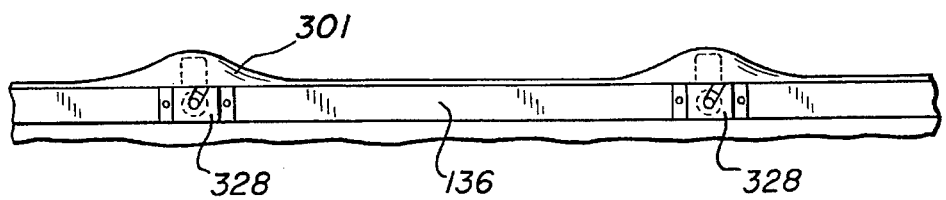
FIG. 16 is a partial, side view of attachment means of the first embodiment of the present invention with the first rail assembly removed and showing in cross-section locking pins of cross bar members.

Provided on the underside 301a of the cover 301 is a plurality of wrap-around securing elements 330, formed from waterproof cloth or the like. Each securing element 330 is sewn or otherwise fastened to the underside 301a of the cover 301 and positioned to wrap-around and lock with a corresponding cross bar member 322. First and second snap elements 330a and 330b are provided on the wrap-around elements 330 to secure each element 330 to its corresponding cross bar member 322. Thus, by manually fastening together the first and second snap elements 330a and 330b on each wrap-around element 330, the wrap-around elements 330, and hence the cover 301, are secured to the cross bar members 322. The cross bar members 322 are, in turn, locked into position when they are inserted into angled slots 328a and the hatch assembly 150 is positioned in its "down" position (see FIGS. 11 and 16). This results because the angled slots 328a, which receive the first and second locking pins 324 and 326 of the cross bar members 322, are sloped so that their entrances 328a' are positioned away from the hatch assembly 150, see FIG. 15.

FIGS. 17 and 18, where like reference numerals indicate like elements, show attachment means 340 for securing the cover 301 to the rail means 110. The attachment means 340 is a modified attachment means of the type shown in FIGS. 2 and 15. The attachment means 340 includes two securing cables 342 which are sewn or otherwise secured within the marginal side edges 306 and 308 of the cover 301, such as shown in FIG. 17. Attached by bolts 344a along the length of each of the cap rails 126 and 136 and to members 152a and 152c of the hatch assembly 150 are a plurality of attachment brackets 344. Each bracket 344 includes first and second locking recesses 344b and 344c, respectively. As shown in FIG. 17, the cover 301 includes notched portions 307 along it side edges 306 and 308 through which sections of the securing cables 342 are exposed for securement to corresponding brackets 344. Thus, by inserting the exposed cable sections within the locking recesses 344b and 344c of brackets 344, the cover 301 is secured to the rail means 110.

Springs 346 are connected to each of the cables 342 for allowing the hatch assembly 150 to be moved to the "up" position, as shown in FIG. 18. Each spring 346 is connected at a first end to a support 346a fixed to the hatch assembly 150 and at a second end to its respective cable 342. Each cable 342 is also connected to an end bracket 344d.

The attachment means 340 preferably further includes permanent fasteners, such as screw fasteners or rivets (not shown), for lockingly connecting the cover 301 to frame member 152b of the hatch assembly 150. Cover snap elements 310, rail snap elements 312 and hatch snap elements 314, such as shown in FIGS. 2 and 15, may additionally be provided to further attach the cover 301 to the first and second cap rails 126 and 136 and frame members 152a and 152c of the hatch assembly 150. The attachment means 340 also preferably includes an interlocking rod or cord 302a for connecting the front edge 302 of the cover 301 to the rail means 110. Cross bar members 322, or cables which extend across the truck bed 200 may additionally be provided for center support of the cover 301.

FIG. 19–20, where like reference numerals indicate like elements, show attachment means 350 for securing the cover 301 to the rail means 110. The attachment means 350 is a further modified attachment means of the type shown in FIGS. 2 and 15. As shown in FIGS. 19 and 20, cap rail 126' includes a recess 352 capable of receiving a first elongated strip 354 having a plurality of first male rail snap elements 354a fixedly positioned along its length. The strip 354 is secured within the recess 352 by screws 354b or like fasteners. A plurality of female cover snap elements 356 are positioned along corresponding portions of the first and second side edges 306 and 308 of the cover 301. Each cover snap element 356 includes an elongated intermediate section 356a and a engaging base section 356b, as shown in FIG. 19.

A first translating locking strip 358 is likewise received within the recess 352. Spaced along the length of the locking strip 358 are a plurality of locking apertures 359 having a receiving portion 359a and a locking portion 359b. The strip 358 further includes a cam follower surface 360 which engages with a corner portion 152c' of frame member 152c.

When the hatch assembly 150 is in the "up" position, as shown in FIG. 21, the strip 358 is biased toward the hatch assembly 150 by a spring 362. The spring 362 is connected at a first end to a pin 364 fixedly connected to the first cap rail 126', as shown in FIG. 19, and is connected at its second end to a protruding securing element 358a on the strip 358. While the hatch assembly 150 is in the "up" position, the cover snap elements 356 may be fastened to or unfastened from the rail snap elements 354a through the receiving portions 359a of apertures 359. When the hatch assembly 150 is in the "down" position, the corner portion 152c' engages with the cam follower 360 and acts to overcome the spring force and push the strip 358 away from the hatch assembly 150 to its "locking" position, as shown in FIG. 22. When the strip 358 is in its "locking" position, the locking portions 359b of the apertures 359 engage with the elongated sections 356a of the cover snap elements 356 to lock the base sections 356b of the snap elements 356 in fastened engagement with corresponding rail snap elements 354a, thereby securing the cover 301 to the rail means 110.

The second cap rail (not shown) is formed in the same manner as cap rail 126'. Furthermore, it includes a second elongated strip and a second translating strip, which are constructed in essentially the same manner as strips 354 and 358 shown in FIG. 19.

The attachment means 350 preferably further includes permanent fasteners, such as screw fasteners or rivets (not shown), for lockingly connecting the cover 301 to members 152a, 152b, and 152c of the hatch assembly 150. Alternatively, male and female snap elements, such as shown in FIGS. 1 and 2, may be employed for connecting the cover 301 to the hatch assembly 150. The attachment means 350 also preferably includes an interlocking rod or cord 302a for connecting the front edge 302 of the cover 301 to the rail means 110. Cross bar members 322, or cables which extend across the truck bed 200 may additionally be provided for center support of the cover 301.

While spring 362 is shown in FIGS. 19, 21 and 22 as comprising a tension spring, it is further contemplated that a compression spring could alternatively be used in its stead.

Figure 23:
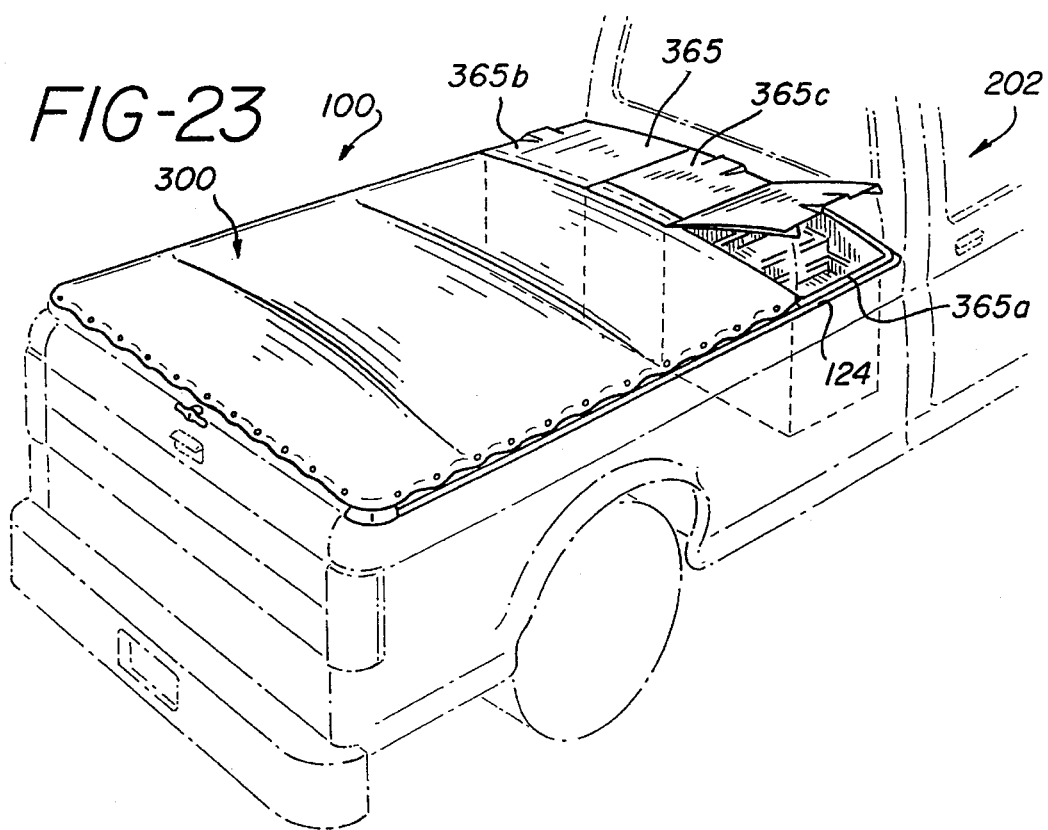

It is further contemplated by the present invention, that a utility box 365 may overlie and be fixed to the rail means 110, as shown in FIG. 23. Portions of the cap rails 126 and 136 are removed so that the opposite end portions 365a and 365b of the utility box 365 may rest directly upon the base rails 122 and 132 and the fill rails 124 and 134. The utility box 365 is preferably secured to the base rails 122 and 132 via bolts or like fasteners through the inside of the box 365. It is further contemplated by the present invention that the utility box 365 may include an ice chest 365c positioned therein.

It is also contemplated by the present invention that a bulkhead 370 made from a net material or the like, shown in FIG. 1, may be pivotably connected to the first and second rail assemblies 120 and 130 by, for example, a pivot rod (not shown) extending between the two assemblies 120 and 130.

Having described the invention in detail and by reference to preferred embodiments thereof, it will be apparent that modifications and variations are possible without departing from the scope of the invention defined in the appended claims.

What is claimed is:

1. A modular rail system for supporting a cover on a pickup truck bed which includes a front wall, an end wall, and opposing first and second side walls, the side walls each having a generally horizontal top surface, the system comprising:

a first elongated rail assembly releasably connected with said first side wall by a portion of said first elongated rail assembly having threaded openings therein, bolts being threaded upward within said threaded openings, and a lower support plate positioned intermediate said bolts and a lower surface of an extended portion of said first side wall so as to clamp said first elongated rail assembly to said extended portion of said first side wall without affixing any fasteners in the truck bed;

said first elongated rail assembly including an elongated member having an outer surface with an elongated first channel located therein, defining a first elongated opening;

a second elongated rail assembly releasably connected with said second side wall by a portion of said second elongated rail assembly having threaded openings therein, bolts being threaded upward within said threaded openings of said second assembly, and a lower support plate positioned intermediate said bolts and a lower surface of an extended portion of said second side wall so as to clamp said second elongated rail assembly to said extended portion of said second side wall without affixing any fasteners in the truck bed;

said second elongated rail assembly including an elongated member having an outer surface with an elongated second channel located therein, defining a second elongated opening; and a first support, associated with said first elongated rail assembly, and a second support, associated with said second elongated rail assembly, each support having a mating member thereon, the mating member for said first support being received in the first elongated opening of said first elongated channel and the mating member for said second support being received in the second elongated opening of said second elongated channel, wherein said first support comprises a first attachment associated with said first elongated rail assembly for lockingly attaching the cover to said first rail assembly and said second support comprises a second attachment associated with said second rail assembly for lockingly attaching the cover to said second rail assembly.

2. A modular rail system as set forth in claim 1 wherein said first elongated rail assembly comprises a first base rail capable of releasably connecting with said first side wall, a first fill rail associated with said first base rail, and a first cap rail associated with said first fill rail, and said second rail assembly comprises a second base rail capable of releasably connecting with said second side wall, a second fill rail associated with said second base rail, and a second cap rail associated with said second fill rail.

3. A modular rail system as set forth in claim 1 further including:

a plurality of rail snap elements fixedly connected to said first and second rail assemblies; and said cover, said cover being a flexible cover having a periphery and a plurality of cover snap elements fixedly connected along at least a part of the periphery thereof, each of said cover snap elements being capable of fastening with a corresponding one of said rail snap elements to attach said flexible cover to said first and second rail assemblies;

wherein said first attachment and said second attachment locks said cover snap elements in fastened engagement with said rail snap elements, thereby securing said flexible cover to said first and second rail assemblies.

4. A cover assembly for a cargo area of a vehicle, wherein said cargo area includes a front wall, an end wall, and opposing first and second side walls, said side walls each having a generally horizontal top surface, the assembly comprising:

first and second rail assemblies overlying the top surfaces of said first and second side walls, respectively, of said vehicle for releasably connecting with said side walls, each rail assembly having an elongated recess formed therein;

a flexible cover having a periphery comprising a front edge, an end edge, and first and second side edges, said flexible cover being positioned over at least a portion of said cargo area for covering said portion of said cargo area;

a first plurality of rail snap elements fixedly positioned in the first rail assembly recess and a second plurality of rail snap elements fixedly positioned in the second rail assembly recess;

a plurality of cover snap elements fixedly positioned along at least a part of the periphery of said flexible cover, each of a first portion of said cover snap elements being capable of fastening with a corresponding rail snap element of said first plurality in the first rail assembly recess, and each of a second portion of said cover snap elements being capable of fastening with a corresponding rail snap element of said second plurality in the second rail assembly recess; and a first locking attachment slidably positioned in the first rail assembly recess for locking said first portion of said cover snap elements in fastened engagement with said first plurality of rail snap elements, and a second locking attachment slidably positioned in the second, rail assembly recess for locking said second portion of said cover snap elements in fastened engagement with said second plurality of rail snap elements.

5. A cover assembly as set forth in claim 4 wherein said first rail assembly includes a first base rail capable of releasably connecting with said first side wall, a first fill rail positioned adjacent to and connected with said first base rail, and a first cap rail overlying said first base rail and said first fill rail and being connected to at least one of said first base rail and said first fill rail; and said second rail assembly includes a second base rail capable of releasably connecting with said second side wall, a second fill rail positioned adjacent to and connected with said second base rail, and a second cap rail overlying said second base rail and said second fill rail and being connected to at least one of said second base rail and second fill rail.

\* \* \* \* \*